(12) United States Patent
Bixel et al.

(10) Patent No.: US 6,339,309 B1
(45) Date of Patent: Jan. 15, 2002

(54) METHOD AND APPARATUS FOR SWITCHING AN AC MOTOR BETWEEN TWO POWER SUPPLIES

(75) Inventors: Paul Scott Bixel, Salem; Craig William Moyer; David Gray Roberson, Jr., both of Roanoke; Barry Earle Dick, Salem, all of VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/453,408

(22) Filed: Dec. 3, 1999

(51) Int. Cl.[7] .................................................. H02P 1/24
(52) U.S. Cl. ........................ 318/727; 318/800; 318/822
(58) Field of Search ................................. 318/727, 800, 318/801, 786, 828, 822

(56) References Cited

U.S. PATENT DOCUMENTS

| | | | | |
|---|---|---|---|---|
| 4,012,679 A | * | 3/1977 | Matsuda et al. ............ 318/167 |
| 4,199,037 A | | 4/1980 | White ...................... 180/65 C |
| 4,581,692 A | | 4/1986 | Nayberg et al. .............. 363/27 |
| 4,879,624 A | * | 11/1989 | Jones et al. .................... 361/65 |
| 5,057,759 A | | 10/1991 | Ueda et al. .................. 318/616 |
| 5,754,868 A | * | 5/1998 | Yamamoto et al. ..... 395/750.01 |
| 5,764,009 A | | 6/1998 | Fukaya et al. ............... 318/300 |
| 5,939,799 A | * | 8/1999 | Weinstein ..................... 307/64 |
| 5,952,812 A | | 9/1999 | Maeda ........................ 318/803 |
| 6,014,007 A | | 1/2000 | Seibel et al. ................ 318/805 |
| 6,051,893 A | * | 4/2000 | Yamamoto et al. ........... 307/43 |

\* cited by examiner

*Primary Examiner*—Marlon T. Fletcher
*Assistant Examiner*—Rina I. Duda
(74) *Attorney, Agent, or Firm*—Hunton & Williams

(57) ABSTRACT

A method and apparatus for switching an AC motor between two power supplies such as supply mains and a variable frequency AC motor drive. In a transfer procedure, the motor drive is coupled to the motor to power the motor. When the supply main is connected to the motor, a resulting current spike in the output of the motor drive is detected to disconnect the motor drive from the motor very quickly while limiting current. In a capture procedure, both power supplies are coupled to the motor with the motor drive in an idle mode. When the supply mains are disconnected from the motor, the voltage change in the output of the motor drive is detected to quickly activate the motor drive to power the motor.

37 Claims, 4 Drawing Sheets

METHOD AND APPARATUS FOR SWITCHING AN AC MOTOR BETWEEN TWO POWER SUPPLIES

BACKGROUND OF THE INVENTION

The invention relates to switching of an AC motor between power from different sources, such as power from supply mains of a power utility and power from a power converter, such as a variable frequency AC motor drive. More specifically, the invention is a method and apparatus for accomplishing such a transfer at high speed to eliminate the need for a line inductor to control currents.

In many applications, it is desirable to switch an AC motor receiving power directly from supply mains to receive power from a power converter, or vice versa. The phrase "supply mains", as used herein, refers to any source of AC electric power having a frequency that is determined by the power utility. The term "power converter" as used herein refers to any source of AC electric power having a frequency that is generated by a mechanism other than the power utility, such as an inverter, a three phase AC variable frequency motor drive, a smart motor starter, an uninterruptible power supply or the like.

For example, in gas turbine static starters, a variable frequency motor drive is often used to bring a generator motor up to a self-sustaining speed at which the generator motor can subsequently be switched to supply mains. In other applications, such as variable speed fans and pumps, it is desirable to achieve variable speed with a variable frequency drive and subsequently switch the motor to supply mains for sustained operation at a constant high speed. Also, in the event of failure of the motor drive, it is desirable to switch the motor to the supply mains to continue operation. Similarly, it is often desirable to switch a motor from supply mains back to a motor drive for slowing the motor down or otherwise varying the speed or torque of the motor.

Switching of a motor from a power converter to supply mains is referred to "transfer" herein and switching of a motor from supply mains to a power converter is referred to as a "capture" herein. FIG. 1 illustrates a conventional system for transfer and capture. System 10 includes supply mains 12, a source of three phase AC power at frequency f, power converter 14, a variable frequency AC drive for example, drive output contactor 16, utility contactor 18, and motor 20. It can be seen that operation of contactors 18 and 16 can be controlled to selectively couple motor 20 directly to supply mains 12, to power converter 14, or to both.

Conventionally, both power converter 14 and the supply mains 12 are coupled to motor 20 for a brief period of time, i.e. in an overlapping manner, during transfer or capture to provide a smooth transfer or capture procedure. This is known as a "make before break" transfer or capture. However, this can cause very high currents to flow between power converter 14 and supply mains 12 due to instantaneous voltage differences between the two. If not controlled, the high currents can cause damage to power converter 14 and can cause undesirable operation of the motor 20. Accordingly, an inductor, such as line reactor 22, is disposed in the power circuit between the output of power converter 14 and supply mains 12. However, the use of an inductor increases, the cost and size of the power transfer system, and increases electrical losses. Alternatively, one of power converter 14 and supply mains 12 can be disconnected prior to connecting the other, i.e. a "break before make" transfer or capture. However, such a procedure causes an undesirable bump in the power delivered to the load due to the inherently slow response time of contactors 16 and 18. In particular, a contactor ordinarily takes about 50 milliseconds to close. Recently, medium power solid state switching devices, such as IGCTs have been developed and used in the output section of variable speed motor drives. However, a reliable method of taking advantage of the high speed and commutation ability of such devices in transfer and capture applications is not known.

BRIEF SUMMARY OF THE INVENTION

A first aspect of the invention is an apparatus for switching an AC motor between two power supplies having instantaneous voltage differences, comprising a first switch mechanism adapted to be coupled to a first power supply and a motor to selectively couple the motor to the first power supply, a second switch mechanism adapted to be coupled to a second power supply and the motor to selectively couple the motor to the second power supply, a current detector adapted to be coupled to the first power supply to monitor output current of the first power supply, and a controller coupled to the first switch mechanism and the second switch mechanism and configured to control the status of the first switch mechanism and the second switch mechanism. With the first switch mechanism in a closed state and the second switch mechanism in an open state to allow the motor to run under power from the first power supply, the controller is operative to close the second switch mechanism in response to a transfer signal and subsequently place the first power supply in an idle mode when the current detector indicates that an instantaneous current in the output of the first power supply has changed by a predetermined threshold amount to transfer the motor to run under power from the second power supply.

A second aspect of the invention is an apparatus for switching to an AC motor between two power supplies having instantaneous voltage differences, comprising a first switch mechanism adapted to be coupled to a first power supply and a motor to selectively couple the motor to the first power supply, a second switch mechanism adapted to be coupled to a second power supply and the motor to selectively couple the motor to the second power supply, a voltage detector adapted to be coupled to the first power supply to monitor the output voltage of the first power supply, and a controller coupled to the first switch mechanism and the second switch mechanism and configured to control the status of the first switch mechanism and the second switch mechanism. With the first switch mechanism in a closed state, the second switch mechanism in a closed state and the first power supply in an idle mode, the controller being operative to open the second switch mechanism and subsequently activate the first power supply when the voltage detector indicates that an output voltage of the motor changes by a predetermined threshold amount to capture the motor to run under power from the first power supply.

A third aspect of the invention is a method of switching an AC motor between two power supplies having instantaneous voltage differences comprising the steps of coupling a first power supply to a motor to power the motor with the first power supply, coupling a second power supply to the motor while the first power supply is coupled to the motor, and placing a first power supply in an idle mode when output current of the first power supply changes by a predetermined amount to power the motor with the second power supply.

A fourth aspect of the invention is a method of switching an AC motor between two power supplies having instantaneous voltage differences comprising the steps of coupling a second power supply to a motor to power the motor with the second power supply, coupling a first power supply to the motor while the second power supply is coupled to said motor and the first power supply is in an idle mode, uncoupling the second power supply from the motor, and activating the first power supply when output voltage of the first power supply changes by a predetermined amount to power the motor with the first power supply.

A fifth aspect of the invention is an apparatus for switching power supplies to an AC motor comprising, an AC motor, a variable frequency AC motor drive, a first contactor coupled to the variable frequency AC motor drive and the motor to selectively couple the motor to the variable frequency AC motor drive, supply mains, a second contactor coupled to the supply mains and the motor to selectively couple the motor to the supply mains, a current detector coupled to the variable frequency AC motor drive to monitor the output current of the variable frequency AC motor drive, and a controller coupled to the first contactor and the second contactor and configured to control the status of the first contactor and the second contactor. With the first contactor in a closed state and the second contactor in an open state to allow the motor to run under power from the variable frequency AC motor drive, the controller is operative to close the second contactor in response to a transfer signal and subsequently place the AC motor drive in an idle mode when the current detector indicates that an instantaneous current in an output of the variable frequency AC motor drive changes by a predetermined amount to transfer the motor to run under power from the supply mains.

A sixth aspect of the invention is an apparatus for switching power supplies to an AC motor, comprising a variable frequency AC motor drive, an AC motor, supply mains, a first contactor coupled to the variable frequency AC motor drive and the motor to selectively couple the motor to the variable frequency AC motor drive, a second contactor coupled to the supply mains and the motor to selectively couple the motor to the supply mains, a voltage detector coupled to the variable frequency AC motor drive to monitor the output voltage of the variable frequency AC motor drive, and a controller coupled to the first contactor and the second contactor and configured to control the status of the first contactor and the second contactor. With the first contactor in a closed state, the second contactor in a closed state and the variable frequency AC motor drive in an idle mode, the controller is operative to open the second contactor and subsequently activate the variable frequency AC motor drive when the voltage detector indicates that an output voltage of the variable frequency AC motor drive changes by a predetermined amount to capture the motor to run under power from the variable frequency AC motor drive.

A seventh aspect of the invention is an apparatus for transferring an AC motor between two power supplies having instantaneous voltage differences comprising, means for coupling a first power supply to a motor to power the motor with the first power supply, means for coupling a second power supply to the motor while the first power supply is coupled to said motor, and means for placing the first power supply in an idle mode when output current of the first power supply changes by a predetermined amount to power the motor with the second power supply.

An eight aspect of the invention is an apparatus for transferring an AC motor between two power supplies having instantaneous voltage differences comprising, means for coupling a second power supply to a motor to power the motor with the second power supply, means for coupling a first power supply to the motor while the second power supply is coupled to the motor and the first power supply is in an idle mode, means for uncoupling the second power supply from the motor and means for activating the first power supply when the output voltage of the first power supply changes by a predetermined amount to power the motor with the first power supply.

BRIEF DESCRIPTION OF THE DRAWINGS

The invention is described herein through a preferred embodiment and the drawing in which.

DETAILED DESCRIPTION OF THE INVENTION

Figure 1:
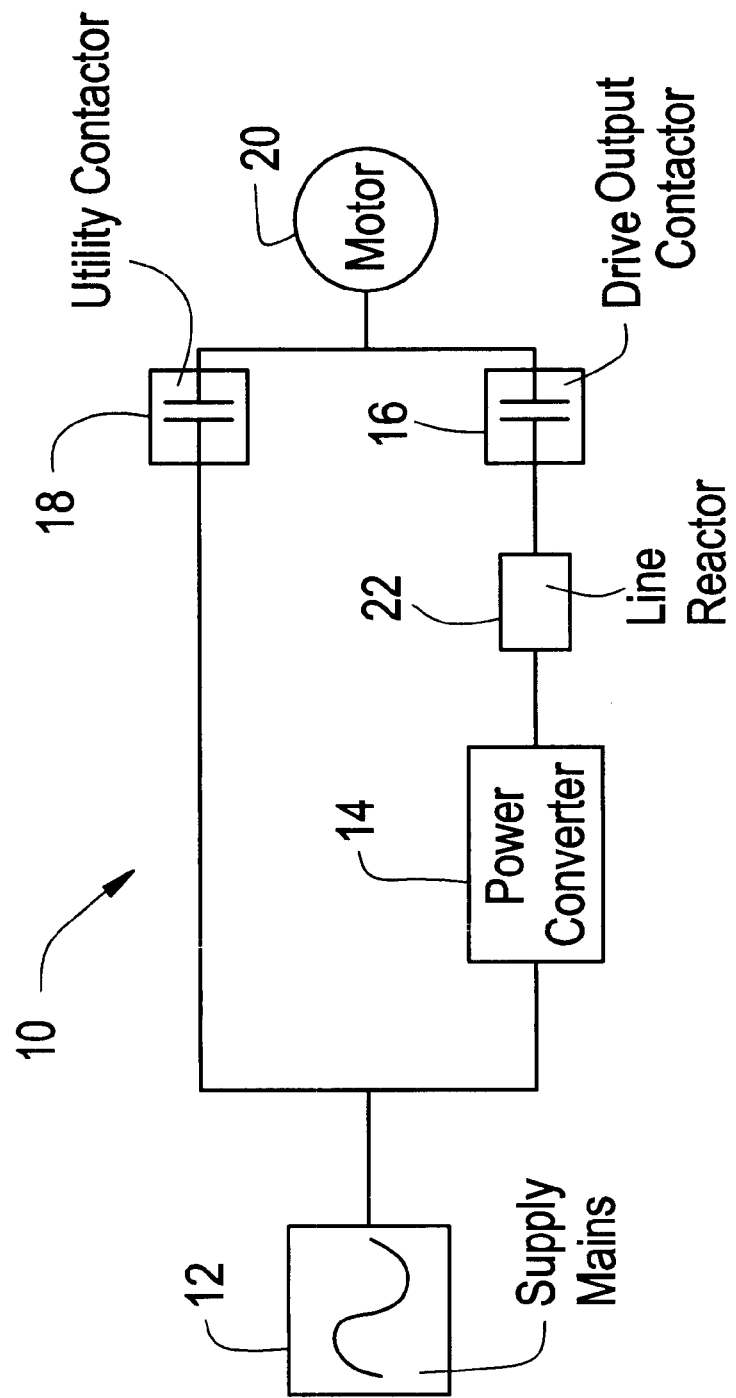
FIG. 1 is a schematic illustration of a conventional system.
Figure 2:
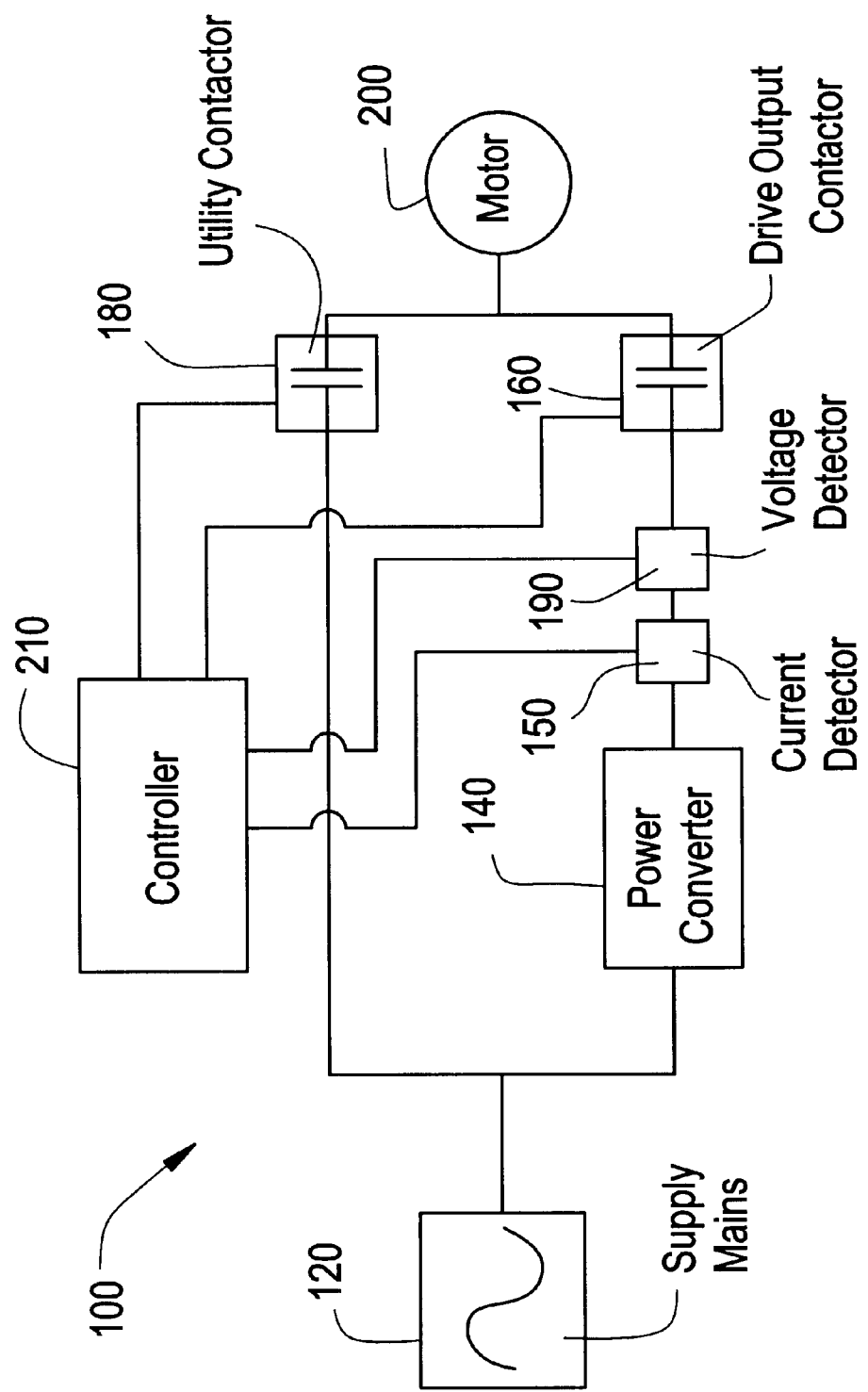
FIG. 2 is a schematic illustration of a system in accordance with a preferred embodiment of the invention.

FIG. 2 illustrates a switching system in accordance with a preferred embodiment. System 100 includes supply mains 120, a source of three phase AC power at frequency f, power converter 140, a variable frequency AC drive for example, drive output contactor 160 (serving as a switching mechanism), utility contactor 180 (also serving as a switching mechanism), and motor 200. It can be seen that operation of contactors 180 and 160 can be controlled to selectively couple motor 200 directly to supply mains 120, to power converter 140, or to both. Controller 210 is operatively coupled to contactors 160 and 180 to control the state of contactors 160 and 180 in a desired manner. Controller 210 can be a microprocessor based device programmed in a desired manner, a hardwired analog logic circuit, or any other mechanism for controlling contactors 160 and 180 in the manner described below. The preferred embodiment also included current detector 150, and voltage detector 190 which are both coupled to controller 210. Controller 210, current detector 150, and voltage detector 190 are illustrated as components that are separate from power converter 140. However, any one or more of the elements can be integral to power converter 140. For example, known variable frequency AC motor drives have a controller and output detectors as integral elements.

Figure 3:
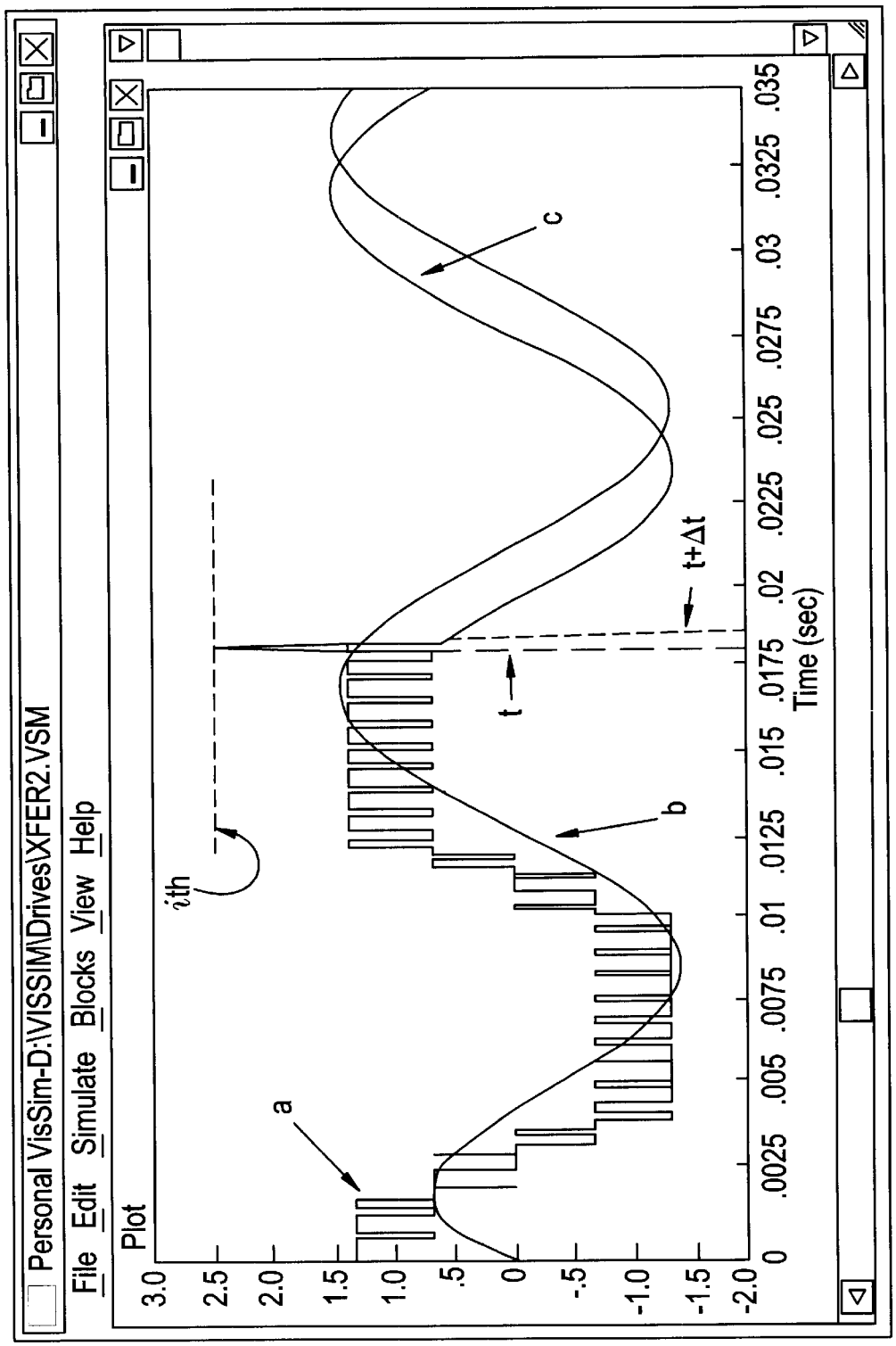
FIG. 3 is a graph of voltage and current during a transfer procedure.

During a transfer procedure, controller 210 monitors the instantaneous current delivered by power converter 140 and compares the instantaneous current with a predetermined threshold current. FIG. 3 illustrates the voltage of power converter 140 prior to transfer (curve a), line current (curve b), and motor voltage after transfer (curve c). All curves are plotted with respect to time. Beginning at time 0, a reference time, contactor 180 is open and contactor 160 is closed so that motor 200 is running under the power of power converter 140. Subsequent to receiving a transfer command, controller 210 closes contactor 180 at time t. It can be seen that a high current condition immediately occurs, as indicated by curve b, due to the instantaneous voltage difference between the output of power converter 140 and supply mains 120. Of course, the voltage and phase of the output of power converter 140 are synchronized with the voltage of supply mains 120 in a known manner. However, power converter 140 generates only a reasonable approximation of an AC signal sufficient to cause a sinusoidal current in motor 200. For example, power converter 140 can have an output section that generates a pulse width modulated (PWM) signal in a known manner, as illustrated in FIG. 3. Accordingly, there will be instantaneous differences between the voltage output by power converter 140 and that of supply mains 120. This high current condition is detected by controller 210 by comparing the value of a signal from current detector 150 with the threshold current level stored in controller 210.

When instantaneous current changes by a predetermined amount, i.e. exceeds the threshold current ($i_{th}$) in the preferred embodiment, power converter 140 is placed in an idle mode by turning all switching bridges in an output section of power converter 140 to an off state, at time t+Δt, to complete the transfer operation with motor 200 running under the power from supply mains 120. Subsequently, contactor 150 can be opened. The level of threshold current $i_{th}$ is selected to be above the peak current being delivered to motor 200 by power converter 140 and below a current level at which damage will be imparted to power converter 140, i.e. a maximum rating of power converter 140. The precise level of $i_{th}$ can easily be determined based on the specifications of the particular equipment and monitoring operating conditions of the motor. The use of current detection in the manner described above, takes advantage of the high speed switching characteristics of the output section of power converter 140 to permit a "make before break" transfer while limiting the current to avoid damage to equipment without the need for an inductance.

Figure 4:
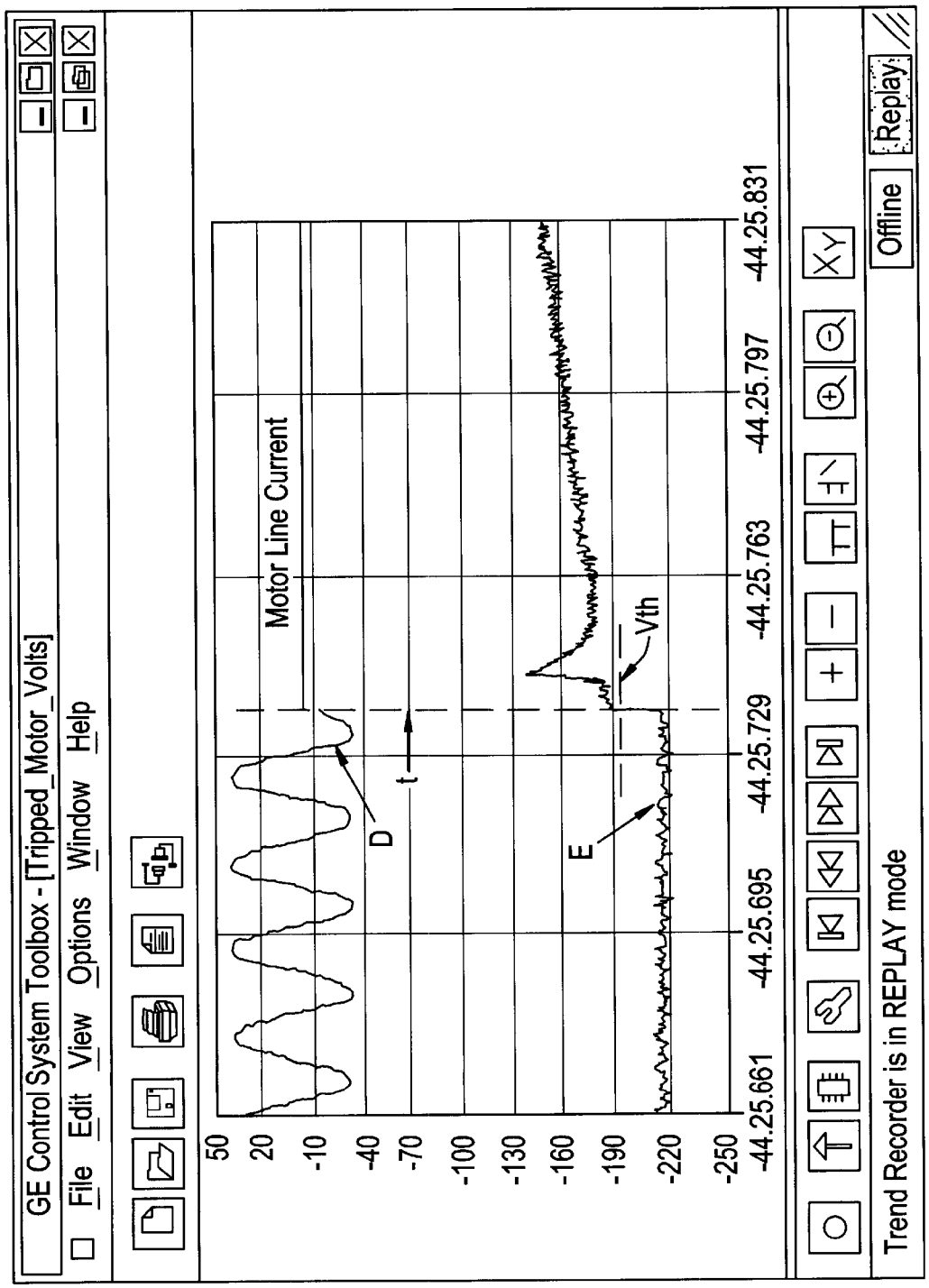
FIG. 4 is a graph of voltage and current during a capture procedure.

FIG. 4 illustrates a capture procedure in accordance with the preferred embodiment. Curve D is the line current and curve E is the motor voltage. Beginning at time 0, a reference time, contactor 180 is closed and contactor 160 is open so that motor 200 is running under the power of supply mains 120. At this time, power converter 140 is in an idle in which its output is substantially 0 volts or otherwise does not drive motor 200. Subsequent to receiving a capture command contactor 160 is closed while power converter 140 remains in the idle mode and controller 210 opens contactor 180 at time t. As a result of opening of contactor 180, the current flowing through windings of motor 200 changes quickly and thus the IR voltage drop decreases rapidly and the self inductance of the motor reverses. These two phenomena cause a voltage change which is detected by voltage detector 190 such as voltage exceeding threshold voltage $v_{th}$. Upon detection of the voltage change, controller 210 very quickly activates power converter 140 to drive motor 200. For example, in the case of a variable frequency motor drive, switching bridges are gated to generate the desired output signal. The threshold voltage is selected to be greater than the counter EMF of motor 200 but less than the utility voltage. The precise level of $v_{th}$ can easily be determined through experimentation based on the specifications of the particular equipment and by detecting operating conditions, such as line voltage and motor voltage during a capture procedure. For example, $v_{th}$ can be equal to 90% of the utility voltage. The use of voltage detection in the manner described above, permits a high speed capture without the need for an inductance to limit current.

It can be seen that the preferred embodiment provides a way to detect opening and closing of a contactor, such as a utility contactor in a very fast manner. Accordingly, the high speed characteristics of the switching bridges of a motor drive or other power converter can be utilized in transfer and capture procedures. The invention can be applied to any type of power supplies having instantaneous voltage differences such as utility mains, motor drives, uninterruptible power supplies, and the like. Any type of switching mechanisms can be used. The invention can be applied to any type of AC motor. Any synchronization method or apparatus can be used in connection with the invention. Any appropriate amount current change or voltage change can be detected to accomplish the procedures described above.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. An apparatus for switching an AC motor between two power supplies having instantaneous voltage differences, comprising a first switch mechanism adapted to be coupled to a first power supply and a motor to selectively couple the motor to the first power supply;

a second switch mechanism adapted to be coupled to a second power supply and the motor to selectively couple the motor to the second power supply;

a current detector adapted to be coupled to the first power supply to monitor output current of the first power supply; and a controller coupled to said first switch mechanism and said second switch mechanism and configured to control the status of said first switch mechanism and said second switch mechanism, with said first switch mechanism in a closed state and said second switch mechanism in an open state to allow the motor to run under power from the first power supply, said controller is operative to close said second switch mechanism in response to a transfer signal and subsequently place the first power supply in a idle mode when said current detector indicates that an instantaneous current in the output of the first power supply changes by a predetermined current amount to transfer the motor to run under power from the second power supply.

2. An apparatus as recited in claim 1, further comprising a voltage detector adapted to be coupled to the first power supply to monitor output voltage of the first power supply and wherein, with said first switch mechanism in a closed state, said second switch mechanism in a closed state and said first power supply in the idle mode, said controller is operative to open said second switch mechanism and subsequently activate the first power supply when said voltage detector indicates that an output voltage of the first power supply changes by a predetermined voltage amount to capture the motor to run under power from the first power supply.

3. An apparatus as recited in claim 2, wherein the first power supply comprises a power converter and the second power supply comprises supply mains.

4. An apparatus as recited in claim 3, wherein the first power supply comprises a variable frequency AC motor drive.

5. An apparatus as recited in claim 4, wherein the variable frequency AC motor drive comprises a pulse width modulation output section.

6. An apparatus as recited in claim 4, wherein the predetermined current amount comprises an amount in which the current exceeds a threshold current level that is above a peak current delivered to the motor by the variable frequency AC motor drive and below a maximum rated current of the variable frequency AC motor drive.

7. An apparatus as recited in claim 4, wherein the predetermined voltage amount comprises an amount in which the voltage exceeds a threshold voltage level that is above a reverse EMF generated by the motor when the second switching mechanism is opened and below the voltage of the supply mains.

8. An apparatus for switching to an AC motor between two power supplies having instantaneous voltage differences, comprising:
   a first switch mechanism adapted to be coupled to a first power supply and a motor to selectively couple the motor to the first power supply;
   a second switch mechanism adapted to be coupled to a second power supply and the motor to selectively couple the motor to the second power supply;
   a current detector adapted to be coupled to the first power supply to monitor the current of the first power supply; and
   a controller coupled to said first switch mechanism and said second switch mechanism and configured to control the status of said first switch mechanism and said second switch mechanism, with said first switch mechanism in a closed state, said second switch mechanism in a closed state and the first power supply in an idle mode, said controller being operative to open said second switch mechanism and subsequently activate the first power supply when said voltage detector indicates that an output voltage of the motor has changed by a predetermined voltage amount to capture the motor to run under power from the first power supply.

9. An apparatus as recited in claim 8, wherein the first power supply comprises a power converter and the second power supply comprises supply mains.

10. An apparatus as recited in claim 9, wherein the first power supply comprises a variable frequency AC motor drive.

11. An apparatus as recited in claim 10, wherein said AC motor drive comprises a pulse width modulation output section.

12. An apparatus as recited in claim 10, wherein the predetermined voltage amount comprises an amount in which the voltage exceeds a threshold voltage level that is above a reverse EMF generated by the motor when the second switching mechanism is opened and below the voltage of the supply mains.

13. A method of switching an AC motor between two power supplies having instantaneous voltage differences, said method comprising the steps of:
   coupling a first power supply to a motor to power the motor with the first power supply;
   coupling a second power supply to the motor while the first power supply is coupled to the motor; and
   placing the first power supply in an idle mode when output current of the first power supply changes by predetermined current amount to power the motor with the second power supply.

14. A method as recited in claim 13, wherein the first power supply comprises a power converter and the second power supply comprises supply mains.

15. A method as recited in claim 13, wherein the first power supply comprises a variable frequency AC motor drive.

16. A method as recited in claim 15, wherein the predetermined current amount comprises an amount in which the current exceeds a threshold current level that is above a peak current delivered to the motor by the variable frequency AC motor drive and below a maximum rated current of the variable frequency AC motor drive.

17. A method of switching an AC motor between two power supplies having instantaneous voltage differences, said method comprising the steps of:
   coupling a second power supply to a motor to power the motor with the second power supply;
   coupling a first power supply to the motor while the second power supply is coupled to said motor and the first power supply is in an idle mode; and
   uncoupling the second power supply from the motor and activating the first power supply when output voltage of the first power supply changes by a predetermined voltage amount to power the motor with the first power supply.

18. A method as recited in claim 16, wherein the first power supply comprises a power converter and the second power supply comprises supply mains.

19. A method as recited in claim 18, wherein the first power supply comprises a variable frequency AC motor drive.

20. A method as recited in claim 19, wherein the predetermined current amount comprises an amount in which the current exceeds a threshold current level that is above a counter EMF of the motor when the second power supply is disconnected and below a voltage of the supply mains.

21. An apparatus for switching power supplies to an AC motor, comprising:
   an AC motor;
   a variable frequency AC motor drive;
   a first contactor coupled to said variable frequency AC motor drive and said motor to selectively couple said motor to said variable frequency AC motor drive;
   supply mains;
   a second contactor coupled to said supply mains and said motor to selectively couple said motor to said supply mains;
   a current detector coupled to said variable frequency AC motor drive to monitor the output current of said variable frequency AC motor drive; and
   a controller coupled to said first contactor and said second contactor and configured to control the status of said first contactor and said second contactor, with the first contactor in a closed state and the second contactor in an open state to allow the motor to run under power from said variable frequency AC motor drive, said controller is operative to close said second contactor in response to a transfer signal and subsequently place said variable frequency AC motor drive in an idle state when said current detector indicates that an instantaneous current in an output of said variable frequency AC motor drive changes by a predetermined current value to transfer said motor to run under power from said supply mains.

22. An apparatus as recited in claim 21, further comprising a voltage detector coupled to said variable frequency AC motor drive to monitor the output voltage of said variable frequency AC motor drive and wherein, with said first contactor in a closed state, said second contactor in a closed state and said variable frequency AC motor drive in an idle mode, said controller is operative to open said second contactor and subsequently activate said variable frequency AC motor drive when said voltage detector indicates that an output voltage of said variable frequency AC motor drive changes by a predetermined voltage amount to capture said motor to run under power from said variable frequency AC motor drive.

23. An apparatus as recited in claim 21, wherein the predetermined current amount is an amount in which the current exceeds a threshold current level that is above a peak current delivered to said motor by said variable frequency AC motor drive and below a maximum rated current of said variable frequency AC motor drive.

24. An apparatus as recited in claim 22, wherein the predetermined voltage amount is an amount in which the voltage exceeds threshold voltage level that is above a reverse EMF generated by said motor when said second conductor is opened and below the voltage of said supply mains.

25. An apparatus as recited in claim 21, wherein said variable frequency AC motor drive comprises a pulse width modulation output section.

26. An apparatus for switching power supplies to an AC motor, comprising:
   a variable frequency AC motor drive;
   an AC motor;
   supply mains;
   a first contactor coupled to said variable frequency AC motor drive and said motor to selectively couple said motor to said variable frequency AC motor drive;
   a second contactor coupled to said supply mains and said motor to selectively couple the motor to said supply mains;
   a voltage detector coupled to said variable frequency AC motor drive to monitor the output voltage of said variable frequency AC motor drive; and
   a controller coupled to said first contactor and said second contactor and configured to control the status of said first contactor and said second contactor, with said first contactor in a closed state, said second contactor in a closed state and said variable frequency AC motor drive in an idle mode, said controller is operative to open said second contactor and subsequently activate said variable frequency AC motor drive when said voltage detector indicates that an output voltage of said variable frequency AC motor drive changes by a predetermined voltage amount to capture said motor to run under power from said variable frequency AC motor drive.

27. An apparatus as recited in claim 26, wherein the predetermined voltage amount is an amount in which the voltage exceeds a threshold voltage level that is above a reverse EMF generated by said motor and below the voltage of said supply mains.

28. An apparatus for transferring an AC motor between two power supplies having instantaneous voltage differences comprising:

means for coupling a first power supply to a motor to power the motor with the first power supply; and means for coupling a second power supply to the motor while the first power supply is coupled to said motor;

means for placing the first power supply in an idle mode when output current of the first power supply changes by a predetermined current amount to power the motor with the second power supply.

29. An apparatus as recited in claim 28, wherein the first power supply comprises a power converter and the second power supply comprises supply mains.

30. An apparatus as recited in claim 29, wherein the first power supply comprises a variable frequency AC motor drive.

31. An apparatus as recited in claim 30 wherein said variable frequency AC motor drive comprises a pulse width modulation output section.

32. An apparatus as recited in claim 30, wherein the predetermined current amount is an amount in which the current exceeds a threshold current level that is above a peak current delivered to the motor by the variable frequency AC motor drive and below a maximum rated current of the variable frequency AC motor drive.

33. An apparatus for transferring an AC motor between two power supplies having instantaneous voltage differences comprising:
   means for coupling a second power supply to a motor to power the motor with the second power supply;
   means for coupling a first power supply to the motor while the second power supply is coupled to the motor and the first power supply is in an idle mode; and
   means for uncoupling the second power supply from the motor and subsequently activating the first power supply when the output voltage of the first power supply changes by a predetermined voltage amount to power the motor with the first power supply.

34. An apparatus as recited in claim 33, wherein the first power supply comprises a power converter and the second power supply comprises supply mains.

35. An apparatus as recited in claim 34 wherein the first power supply comprises a variable frequency AC motor drive.

36. An apparatus as recited in claim 35, wherein the variable frequency AC motor drive comprises a pulse width modulation output section.

37. An apparatus as recited in claim 36, wherein the predetermined voltage amount is an amount in which the voltage exceeds a threshold voltage level that is above a counter EMF of the motor when the second power supply is disconnected and below a voltage of the supply mains.

* * * * *